Figure 1:
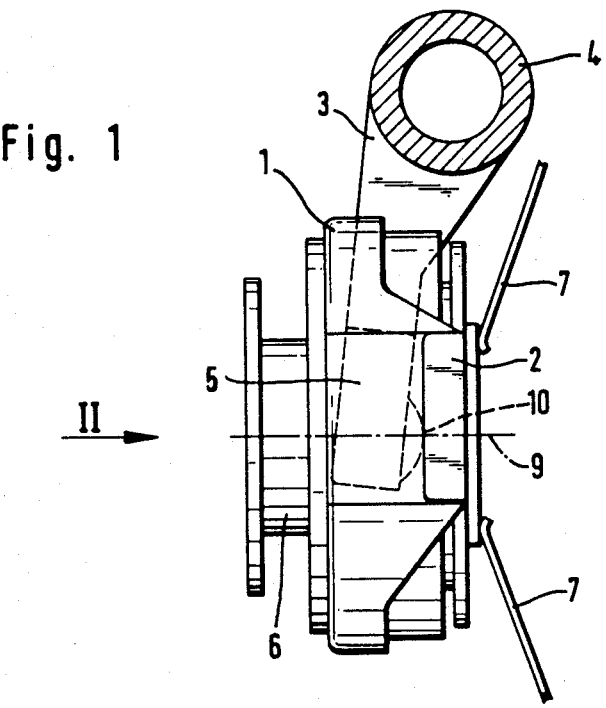

United States Patent [19]

Parzefall

[11] Patent Number: 4,850,467
[45] Date of Patent: Jul. 25, 1989

[54] CLUTCH RELEASE SLEEVE

[75] Inventor: Walter Parzefall, Bubenreuth, Fed. Rep. of Germany

[73] Assignee: INA Walzlager Schaeffler KG, Fed. Rep. of Germany

[21] Appl. No.: 293,342

[22] Filed: Jan. 4, 1989

Related U.S. Application Data

[63] Continuation-in-part of Ser. No. 84,314, Aug. 10, 1987, abandoned, which is a continuation-in-part of Ser. No. 846,898, Apr. 1, 1986, abandoned.

[30] Foreign Application Priority Data

Apr. 24, 1985 [DE] Fed. Rep. of Germany ....... 3514772

[51] Int. Cl.$^4$ ............................................. F16D 13/58
[52] U.S. Cl. ................................... 192/98; 192/99 S; 192/110 B
[58] Field of Search ...................... 192/99 S, 98, 110 B

[56] References Cited

U.S. PATENT DOCUMENTS

| | | | |
|---|---|---|---|
| 3,333,664 | 8/1967 | Chapaitis | 192/98 |
| 3,640,364 | 2/1972 | Utton | 192/98 |
| 4,111,290 | 9/1978 | Carlstedt | 192/98 |
| 4,403,685 | 9/1983 | Beccaris | 192/110 B |
| 4,498,566 | 2/1985 | Renaud | 192/110 B |

FOREIGN PATENT DOCUMENTS 57-90423 6/1982 Japan ..................................... 192/98

Primary Examiner—Rodney H. Bonck
Assistant Examiner—David A. Testardi
Attorney, Agent, or Firm—Bierman and Muserlian

[57] ABSTRACT

A clutch release sleeve for motor vehicles comprising a housing having at two opposite points of its circumference radially extending lugs against which two parallel arms of a clutch fork abut to embrace the housing within reach of two flat faces, characterized in that the lugs (2) have a radial extension (a) of at least 10% of the housing diameter (D) and a tangential extension (b) of at least 25% of the housing diameter (D) and are offset laterally in opposite directions in relation to a straight line running through the sleeve axis (9), on one hand, and through the points of contact (10) of the clutch fork (4) and the lugs (2) on the other hand so that they project over the straight line further in one direction than in the other direction wherein the flat faces are perpendicular to the straight line.

1 Claim, 1 Drawing Sheet

CLUTCH RELEASE SLEEVE

PRIOR APPLICATIONS

This application is a continuation-in-part of U.S. patent application Ser. No. 084,314 filed Aug. 10, 1987 which in turn is a continuation-in-part of U.S. patent application Ser. No. 846,898 filed Apr. 1, 1986, both now abandoned.

STATE OF THE ART

A clutch release sleeve comprising a housing holding a rolling bearing, which housing has at two opposite points of its circumference radially extending lugs against which two parallel arms of a clutch fork abut to embrace the housing within the reach of two flat faces is known and are useful when the radiallly extending lugs are of sufficient width as to be able to absorb without permanent deformation the pressure exerted by the clutch fork. Due to the growing tendency towards compact design, assembly situations arise wherein an adjoining component is arranged within reach of one such lug so that either only this, or else even both lugs have to be reduced in their widths so as to come to lie outside the reach of the adjoining component. If the widths of only one lug is reduced, this complicates the assembly since the bearing has to be inserted in a very specific fitting position. If both lugs are reduced in width, this disadvantage is avoided but reducing the width of both lugs has the disadvantage that they no longer have sufficient strength to withstand operating forces.

OBJECTS OF THE INVENTION

It is an object of the invention to avoid the said disadvantages and to improve the lugs in a simple fashion so that the bearing can be installed without problems and the lugs will still be able to absorb the occurring load without harmful deformation.

This and other objects and advantages of the invention will become obvious from the following detailed description.

THE INVENTION

The novel clutch release sleeve for motor vehicles comprises a housing having at two opposite points to its circumference radially extending lugs against which two parallel arms of a clutch fork abut to embrace the housing within reach of two flat faces, characterized in that the lugs (2) have a radial extension (a) of at least 10% of the housing diameter (D) and a tangential extension (b) of at least 25% of the housing diameter (D) and are offset laterally in opposite directions in relation to a straight line running through the bearing axis (9), on one hand, and through the points of contact (10) of the clutch fork (4) and the lugs (2) on the other hand so that they project over the straight line further in one direction than in the other direction wherein the flat faces are perpendicular to the straight line.

The construction of the invention has the advantage on the one hand, that despite the cramped spatial conditions the free movement of the clutch release sleeve is assured and on the other hand, difficulties during installation are avoided and adequate dimensioning of the lugs is achieved. A further advantage results from the enlarged flat surfaces which makes improved guidance possible so that twisting of the bearing in the clutch flork is reduced.

Referring now to the drawings:

FIG. 1 a partial longitudinal cross-section of a clutch release sleeve of the invention.

Figure 2:
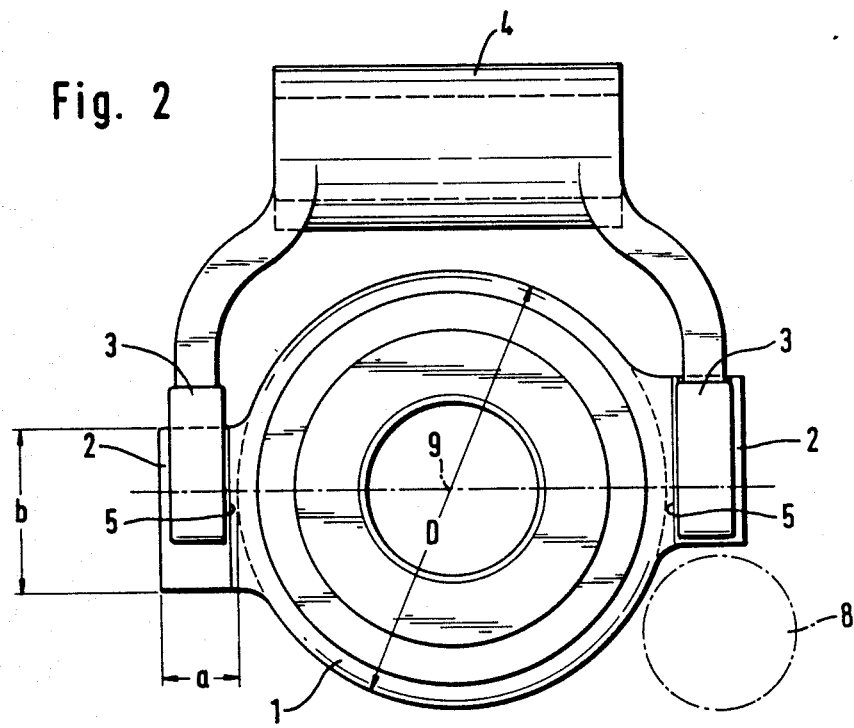

FIG. 2 is a cross-section of the clutch release sleeve of FIG. 1 in the direction of arrow II.

The clutch release sleeve is comprised of housing 1 which receives a rolling bearing (not shown) and which at two opposite points of its circumference has radially extending lugs 2. Resting against lugs 2 are two parallel arms 3 of a clutch fork 4 which embraces housing 1 within the reach of two flat surfaces 5. Housing 1 is axially moveable on a guide tube 6 in a known manner by the action of pivoting clutch fork 4 to interact with cup spring tongues 7 of a clutch (not shown).

As shown in FIG. 2, an indicated shaft 8 passes in the immediate proximity of one of lugs 2 and for this reason, lugs 2 are offset laterally in opposite directions in relation to a straight line running through bearing axis 9, on the one hand, and through the points of contact 10 of clutch fork 4 and lugs 2, on the other hand, so that they project over the straight line further in one direction than in the other direction.

Various modifications of the apparatus of the invention may be made without departing from the spirit or scope thereof and it is to be understood that the invention is intended to be limited only as defined in the appended claims.

What I claim is:

1. A clutch release sleeve for motor vehicles comprising a housing having at two opposite points of its circumference radially extending lugs against which two parallel arms of a clutch fork abut to embrace the housing within reach of two flat faces, characterized in that the lugs (2) have a radial extension (a) of at least 10% of the housing diameter (D) and a tangential extension (b) of at least 25% of the housing diameter (D) and are offset laterally in opposite directions in relation to a straight line running through the sleeve axis (9), on one hand, and through the points of contact (10) of the clutch fork (4) and the lugs (2) on the other hand so that they project over the straight line further in one direction than in the other directions wherein the flat faces are perpendicular to the straight line.

* * * * *